(12) United States Patent
Nagase et al.

(10) Patent No.: US 7,610,133 B2
(45) Date of Patent: Oct. 27, 2009

(54) CONTROLLER FOR ELECTRIC POWER STEERING APPARATUS

(75) Inventors: Shigeki Nagase, Nabari (JP); Norimitsu Yukumatsu, Kobe (JP)

(73) Assignees: JTEKT Corporation, Osaka (JP); Fujitsu Ten Limited, Hyogo (JP)

( * ) Notice: Subject to any disclaimer, the term of this patent is extended or adjusted under 35 U.S.C. 154(b) by 493 days.

(21) Appl. No.: 11/440,923

(22) Filed: May 25, 2006

(65) Prior Publication Data

US 2006/0266575 A1    Nov. 30, 2006

(30) Foreign Application Priority Data

May 30, 2005  (JP) ............................. 2005-157208
Feb. 28, 2006 (JP) ............................. 2006-052799

(51) Int. Cl.
*B62D 5/04*  (2006.01)
*B62D 6/00*  (2006.01)
*G06F 19/00* (2006.01)

(52) U.S. Cl. ............................. 701/41; 701/42; 701/70; 180/446

(58) Field of Classification Search ................... 701/41, 701/42, 70; 180/446, 404
See application file for complete search history.

(56) References Cited

U.S. PATENT DOCUMENTS 6,679,350 B2 * 1/2004 Shimizu et al. ............. 180/446
6,862,507 B2 * 3/2005 Altemare, Jr. et al. ......... 701/41
6,885,927 B2 * 4/2005 Arimura ..................... 701/41
2002/0177932 A1  11/2002 Kifuku et al.
2003/0155879 A1   8/2003 Kifuku et al.

FOREIGN PATENT DOCUMENTS

| EP | 1 149 754 | 10/2001 |
| EP | 1 205 373 | 5/2002 |
| JP | 2002-331946 | 11/2002 |

\* cited by examiner

*Primary Examiner*—Tan Q Nguyen
(74) *Attorney, Agent, or Firm*—Jordan and Hamburg LLP

(57) ABSTRACT

In a controller for an electric power steering apparatus, a target value calculation element, which calculates target values of the drive currents of a motor on the basis of a detected value of the steering torque, is constituted by a first integrated circuit provided in a chip. A drive signal value calculation element, which calculates drive signal values for driving the motor on the basis of the target values calculated by the target value calculation element, detected values of the drive currents of the motor, and a detected value of the rotary position of a rotor of the motor, is constituted by a second integrated circuit provided in another chip from the chip. A driving element drives the motor in accordance with the drive signal values. The first integrated circuit is connected communicably to the second integrated circuit. The calculation cycle of the drive signal values is set to be shorter than the calculation cycle of the target values.

18 Claims, 10 Drawing Sheets

Fig. 9

FIRST EEPROM

|  | MOST SIGNIFICANT | LEAST SIGNIFICANT |
|---|---|---|
| A 1 | 0 0 | 0 0 |
| B 2 | 0 0 | 0 0 |
| C 3 | 0 0 | 0 0 |
| D 4 | 0 0 | 0 0 |
| s u m | 0 0 | 0 0 |

SECOND EEPROM

|  | MOST SIGNIFICANT | LEAST SIGNIFICANT |
|---|---|---|
| A 2 | 0 0 | 0 0 |
| B 3 | 0 0 | 0 0 |
| C 4 | 0 0 | 0 0 |
| D 5 | 0 0 | 0 0 |
| s u m | 0 0 | 0 0 |

Fig. 10

|   | MOST SIGNIFICANT | LEAST SIGNIFICANT |
|---|---|---|
| A | 0 0 | 0 0 |
|   | F F | 0 0 |
|   | 0 0 | F F |
| B | 0 0 | 0 0 |
|   | F F | 0 0 |
|   | 0 0 | F F |
| C | 0 0 | 0 0 |
|   | F F | 0 0 |
|   | 0 0 | F F |
| D | 0 0 | 0 0 |
|   | F F | 0 0 |
|   | 0 0 | F F |

COMPARATIVE EXAMPLE

CONTROLLER FOR ELECTRIC POWER STEERING APPARATUS

FIELD OF THE INVENTION

The present invention relates to a controller for controlling a motor for generating steering assist power in an electric power steering apparatus.

DESCRIPTION OF THE RELATED ART

In a controller for an electric power steering apparatus, target values of the drive currents of a brushless motor which generates steering assist power are calculated on the basis of the steering torque. Drive signal values for driving the motor are then calculated on the basis of the calculated target values, detected values of the drive currents, and a detected value of the rotary position of the rotor. The motor is then driven by a motor driver in accordance with the calculated drive signal values.

The target values of the drive currents described above are calculated using a one-chip microcomputer, the drive signal values are calculated using another one-chip microcomputer, and the two microcomputers are connected by communication lines constituted by wire harnesses (U.S. Pat. No. 6,679, 350).

SUMMARY OF THE INVENTION

The drive signal values corresponding to the rotary position of the rotor should be calculated at high speed in order to control the drive currents of the brushless motor for generating steering assist power with a high degree of precision. Moreover, complicated and non-typological calculation should be performed to correct the target current value in accordance with the rotor rotation speed and so on in order to improve the steering feel of the vehicle driver. However, a high-performance microcomputer is required to perform these high-speed, complicated, and non-typological calculations, so that the cost of the microcomputer is increased.

Furthermore, a dedicated sub-microcomputer and hardware for monitoring circuits to monitor the abnormalities in the calculated values should be provided to perform failsafe processing. However, the provision of the dedicated sub-microcomputer and hardware for monitoring circuits to perform failsafe processing leads to a further increase in cost.

The object of the present invention is to provide a controller for an electric power steering apparatus which can solve the problems described above.

A controller for an electric power steering apparatus according to the present invention comprises a target value calculation element for calculating target values of the drive currents of a brushless motor for generating steering assist power on the basis of at least a detected value of the steering torque; a drive signal value calculation element for calculating drive signal values for driving the motor on the basis of the target values calculated by the target value calculation element, detected values of the drive currents of the motor, and a detected value of the rotary position of a rotor of the motor; and a driving element for driving the motor in accordance with the drive signal values, wherein the target value calculation element is constituted by a first integrated circuit provided in a chip, the drive signal value calculation element is constituted by a second integrated circuit provided in another chip, the first integrated circuit is connected communicably to the second integrated circuit, and a calculation cycle of the drive signal values are set to be shorter than a calculation cycle of the target values.

According to the present invention, the target values of the drive currents are calculated in the first integrated circuit, and the drive signal values based on the target values, the detected values of the drive currents of the motor, and the rotary position of rotor are calculated in the second integrated circuit. Further, the calculation cycle of the drive signal values is set to be shorter than the calculation cycle of the target values. In other words, the calculations of the target values of the drive currents, which are non-typological and more complicated than the calculations of the drive signal values, is performed in the first integrated circuit which performs calculations at a comparatively low speed, while the calculations of the drive signal values, which are typological and comparatively simple, are performed in the second integrated circuit which performs calculations at a comparatively high speed. As a result, the controller does not require a high-performance integrated circuit chip for performing non-typological, complicated calculations at high speed, and instead can be constituted by the chip provided with the first integrated circuit, which is sufficient for performing non-typological, comparatively complicated calculations at comparatively low speed, and the chip provided with the second integrated circuit, which is sufficient for performing typological, comparatively simple calculations at comparatively high speed. Thus the controller can be constituted by low-cost integrated circuit chips. A microcomputer chip can be used as the chip in which the first integrated circuit is provided, and a microcomputer chip, a DSP (Digital Signal Processor), a logic IC chip assembled from a gateway and so on, or another chip can be used as the chip in which the second integrated circuit is provided.

The controller for an electric power steering apparatus according to another aspect of the present invention comprises a first control part having a target value calculation element which calculates target values of the drive currents of a motor for generating steering assist power on the basis of at least a detected value of the steering torque; a second control part having a drive signal value calculation element which calculates drive signal values for driving the motor on the basis of the target values calculated by the target value calculation element, detected values of the drive currents of the motor, and a detected value of the rotary position of a rotor of the motor; and a driving part for driving the motor in accordance with the drive signal values, wherein the second control part is provided in another chip from a chip in which the first control part is provided, the first control part and the second control part are connected communicably, and the calculation cycle of the drive signal values is set to be shorter than the calculation cycle of the target values.

It is preferable that the first integrated circuit has an output monitoring element for judging whether there is an abnormality by comparing the target value calculated by the target value calculation element with the detected value of the drive current, and the second integrated circuit has an input monitoring element for judging whether there is an abnormality by comparing the target value calculated by the target value calculation element with the detected value of the steering torque. Thus, there is no need to provide any dedicated hardware to monitor the presence of an abnormality in the values calculated by the first integrated circuit and second integrated circuit.

In this case, it is preferable that a first input data communication processing part which is capable of communication with a first vehicle condition data input part is constituted by the first integrated circuit so that the target values can be calculated by the target value calculation element in accordance with the detected value of the steering torque and vehicle condition data, and a second input data communication processing part which is capable of communication with a second vehicle condition data input part is constituted by the second integrated circuit, so that the input monitoring element can judge whether there is an abnormality by comparing the target value calculated by the target value calculation element to the detected value of the steering torque and the vehicle condition data. Thus, when the motor is controlled in accordance with not only the detected value of the steering torque but also vehicle condition data such as the vehicle speed and braking force, it can be judged appropriately whether there is an abnormality by comparing the target value calculated in accordance with the steering torque and vehicle condition data to the detected value of the steering torque and the vehicle condition data. As a result, errors can be eliminated in judging whether there is an abnormality during failsafe processing, when the motor is controlled comprehensively in accordance with information relating to the entire vehicle rather than simply steering system information. Furthermore, when an abnormality occurs in one of the two integrated circuits or one of the two input parts, the occurrence of the abnormality can be transmitted to an external system and a controller fault notification can be performed.

It is preferable that the target value calculation element has a derating calculation part for reducing the target values on the basis of a variable corresponding to load of the motor in order to prevent overload. As a result, the need for dedicated hardware for preventing overload is eliminated.

It is preferable that the target value calculation element has a compensatory calculation part for correcting the target values on the basis of detected values of variables affecting the steering torque. As a result, calculations for correcting the target values in order to improve the steering feeling etc. can be performed by the first integrated circuit, which has surplus calculation processing capacity due to its comparatively low calculation speed.

It is preferable that the first integrated circuit comprises a detection condition monitoring element for judging whether there is an abnormality in the detected values required to calculate the target values and drive signal values. Thus, the detection condition monitoring element for judging whether there is an abnormality in the detected values, which are required by the first integrated circuit to calculate the target values and by the second integrated circuit to calculate the drive signal values, can be constituted by the first integrated circuit, which has surplus calculation processing capacity due to its comparatively low calculation speed.

It is preferable to provide a first monitoring part for judging whether there is an abnormality in the operation of the second integrated circuit; and a first auxiliary calculation element for calculating auxiliary drive signal values for the motor, wherein the first auxiliary calculation element is constituted by the first integrated circuit, and provide a signal selection element which connects the driving element to the drive signal value calculation element and the first auxiliary calculation element selectively such that the motor is driven in accordance with the auxiliary drive signal values instead of the drive signal values when an abnormality in the operation occurs in the second integrated circuit. Thus, when an abnormality occurs in the second integrated circuit, the driving element can drive the motor in accordance with the auxiliary drive signal values calculated by the first auxiliary calculation element constituted by the first integrated circuit. Hence, even when an abnormality occurs in the second integrated circuit, the steering assist power can be reduced gently or can be applied through simple control without stopping the motor rapidly, thereby preventing an excessive impact from acting on the driver.

It is preferable to provide a second monitoring part for judging whether there is an abnormality in the operation of the first integrated circuit; and a second auxiliary calculation element for calculating the target values of the drive currents of the motor on the basis of at least the detected value of the steering torque, wherein the second auxiliary calculation element is constituted by the second integrated circuit, and when an abnormality in the operation occurs in the first integrated circuit, the drive signal values for the motor are calculated by the drive signal value calculation element on the basis of the target values calculated by the second auxiliary calculation element. Thus, when an abnormality occurs in the first integrated circuit, the drive signal values for the motor can be calculated on the basis of the target values calculated by the second auxiliary calculation element constituted by the second integrated circuit. Hence, even when an abnormality occurs in the first integrated circuit, the steering assist power can be reduced gently or can be applied through simple control without stopping the motor rapidly, thereby preventing an excessive impact from acting on the driver.

It is preferable to provide a first non-volatile memory for storing control data for the motor and sum check data for the control data; a second non-volatile memory for storing identical control data and sum check data to the control data and sum check data stored in the first non-volatile memory; and a judgment element for judging whether there are abnormal data in one of the two non-volatile memories from the result of sum check of the control data stored in the first non-volatile memory and the result of sum check of the control data stored in the second non-volatile memory, wherein a first stored data communication processing part which is capable of data communication with the first non-volatile memory is constituted by the first integrated circuit such that the control data stored in the first non-volatile memory are used in the calculations performed in the first integrated circuit, and a second stored data communication processing part which is capable of data communication with the second non-volatile memory is constituted by the second integrated circuit such that the control data stored in the second non-volatile memory are used in the calculations performed in the second integrated circuit, when a data abnormality occurs in the first non-volatile memory, the control data stored in the second non-volatile memory are used in the calculations performed in the first integrated circuit via the second stored data communication processing part, and when a data abnormality occurs in the second non-volatile memory, the control data stored in the first non-volatile memory are used in the calculations performed in the second integrated circuit via the first stored data communication processing part. Thus, when a data abnormality occurs in one of the non-volatile memories, calculation can be performed in accordance with the data stored in the other non-volatile memory. Furthermore, whether there are abnormal data in the non-volatile memories can be judged simply by storing sum check data in addition to the control data, and hence the amount of data required to judge whether there are abnormal data can be reduced, enabling a reduction in the overall storage capacity of the non-volatile memories.

According to the controller for an electric power steering apparatus of the present invention, the drive currents for the brushless motor for generating steering assist power can be controlled with a high degree of precision, thereby improving the steering feeling of the driver, and the high-speed, non-typological, complicated calculations required to perform failsafe processing can be performed at low cost. Moreover, an excessive impact can be prevented from acting on the driver during failsafe processing.

BRIEF DESCRIPTION OF THE DRAWINGS

FIG. 9 is a view illustrating control data stored in the EEPROM according to the second modified example of the present invention; and FIG. 10 is a view illustrating control data stored in an EEPROM according to a comparative example of the present invention.

DESCRIPTION OF THE PREFERRED EMBODIMENTS

Figure 1:
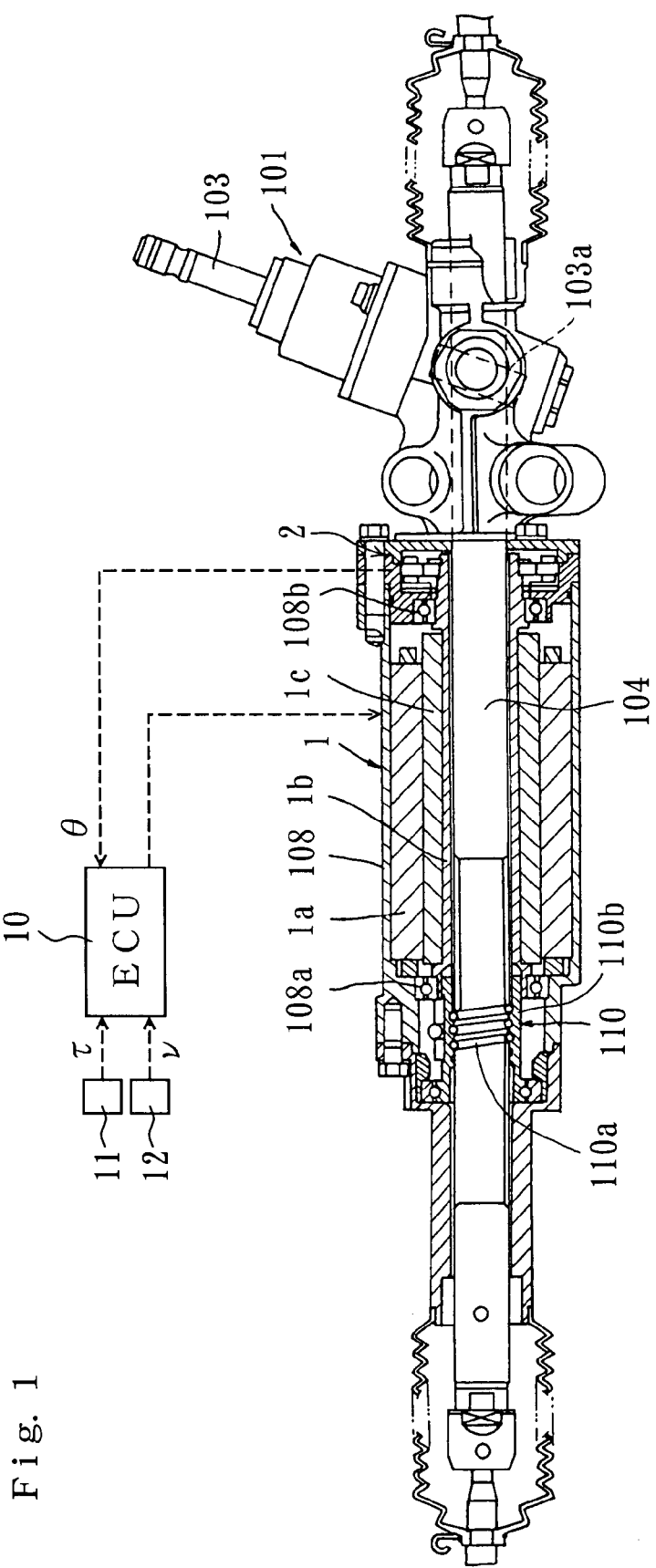
FIG. 1 is a partially fractured front view of an electric power steering apparatus according to an embodiment of the present invention.

A rack and pinion type electric power steering apparatus 101 for a vehicle, shown in FIG. 1, comprises a steering shaft 103 which is rotated by steering operation, a pinion 103a provided on the steering shaft 103, a rack 104 which meshes with the pinion 103a, and a three-phase brushless motor 1 for generating steering assist power. Each end of the rack 104 is connected to a vehicle wheel (not shown in the drawing) for steering. The pinion 103a is rotated by the steering operation, whereby the rack 104 moves in its longitudinal direction along the width direction of the vehicle. The steering angle is varied by the movement of the rack 104.

The motor 1 comprises a stator 1a having coils of U, V and W phases, which is fixed to a housing 108 covering the rack 104, a tubular rotor 1b supported rotatably by the housing 108 via bearings 108a, 108b, a magnet 1c attached to the rotor 1b, and a resolver 2 by which a rotary position detection part for detecting the rotary position of the rotor 1b is constituted. The rack 104 is surrounded by the rotor 1b. A screw mechanism 110 comprises a ball screw shaft 110a formed integrally with the outer periphery of the rack 104, and a ball nut 110b which engages with the ball screw shaft 110a via balls. The ball nut 110b is connected to the rotor 1b of the motor 1. Thus the ball nut 110b is driven so as to rotate by the motor 1, and the steering assist power is applied along the longitudinal direction of the rack 104 by means of the rotation of the ball nut 110b. The motor 1 and resolver 2 are connected to a controller 10 known as an ECU. A torque sensor 11 for detecting steering torque τ transmitted by the steering shaft 103, a vehicle speed sensor 12 for detecting vehicle speed v, and a battery not shown in the drawing are connected to the controller 10.

Figure 2:
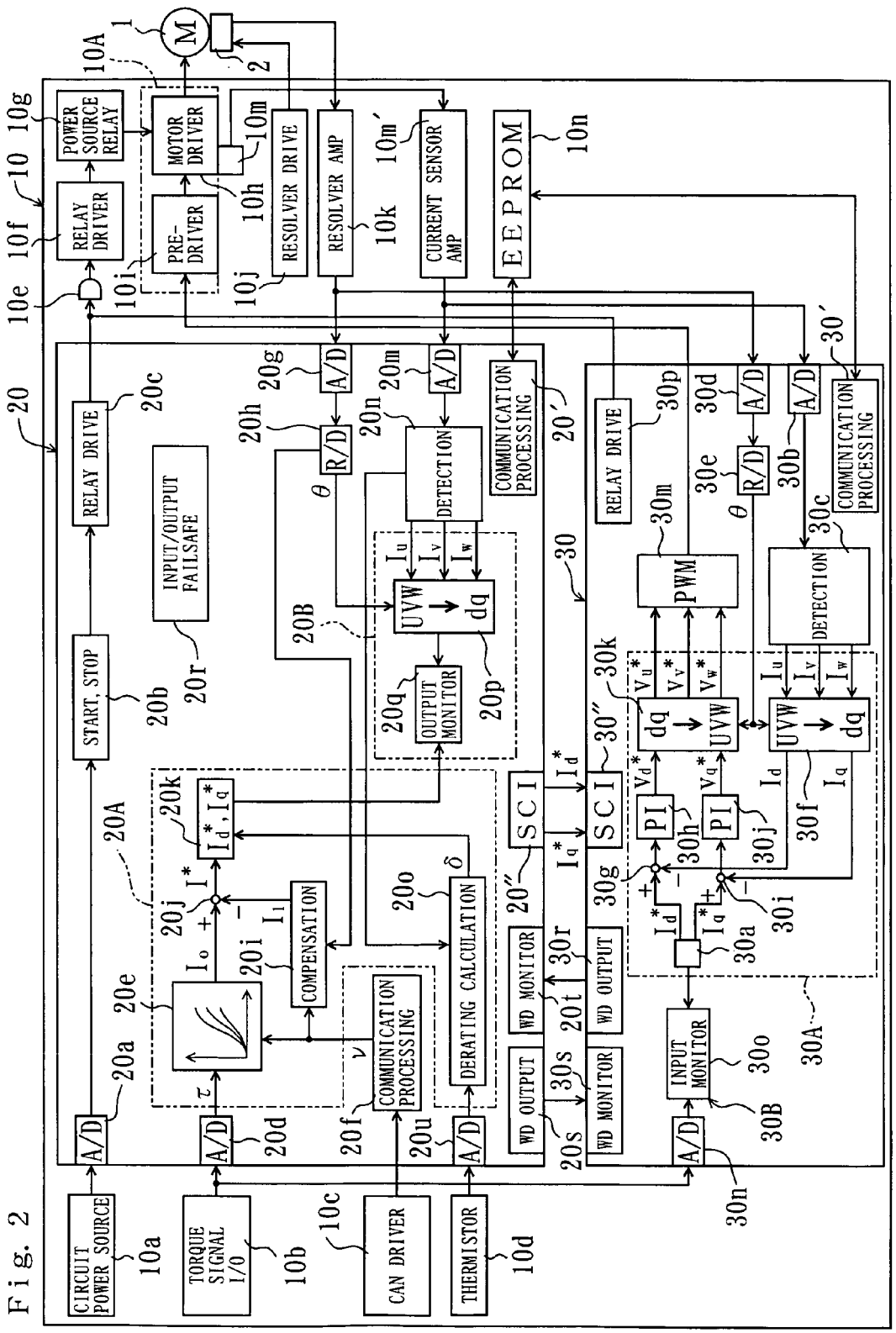
FIG. 2 is a view illustrating the constitution of a controller according to the embodiment of the present invention.

FIG. 2 shows the circuits formed in the controller 10 as function blocks. The controller 10 comprises a microcomputer chip 20 and a DSP chip 30. The controller 10 also comprises a circuit power source 10a including a regulator for regulating the battery voltage to a constant level, an I/O interface 10b into which signals from the torque sensor 11 are input, a CAN driver 10c (first vehicle condition data input part) into which signals from the vehicle speed sensor 12 are input via a CAN (Control Area Network), a thermistor 10d for detecting the internal atmospheric temperature of the controller 10, an amplifier 10e, a relay driver 10f, a power source relay 10g, a motor driver 10h, a pre-driver 10i, a resolver driving part 10j, a resolver amp 10k, a current sensor amp 10m', and an EEPROM 10n. Communication processing parts 20', 30' for communicating with the EEPROM 10n are provided in the microcomputer chip 20 and DSP chip 30 such that the microcomputer chip 20 and DSP chip 30 are initialized in accordance with a program stored in the EEPROM 10n when the controller 10 is activated, and control data for the motor 1 stored in the EEPROM 10n are used in calculations performed in a first integrated circuit. For example, when initialization is performed by the program stored in the EEPROM 10n, initial values required for the calculations performed in the first integrated circuit and a second integrated circuit are set. A predetermined correction value for offset-correcting the detected value of the steering torque τ is stored in the EEPROM 10n as the control data for the motor 1. More specifically, variation of the detected value of the steering torque τ from the actual value, which occurs due to individual differences in the torque sensor 11, is measured in advance, and this measured value is set as the correction value. The detected value of the steering torque τ, used in the calculations performed in the first integrated circuit and second integrated circuit, is offset-corrected using the correction value stored in the EEPROM 10n.

A known current sensor 10m for detecting actual currents $I_U$, $I_V$, $I_W$ flowing through the respective coils of U phase, V phase and W phase, which are the drive currents of the motor 1, is connected to the motor driver 10h, and the detected values are amplified by the current sensor amp 10m'.

The first integrated circuit provided in the microcomputer chip 20 is illustrated in FIG. 2 as a function block, and exhibits the following functions.

A signal corresponding to the ON/OFF operation of the ignition switch in the vehicle is input into a start/stop control part 20b via an A/D conversion part 20a, and a relay control signal corresponding to the ON/OFF operation is generated in a relay drive control part 20c. The power source relay 10g is driven via the amplifier 10e and relay driver 10f by means of the relay control signal, so that power supply from the battery to the motor driver 10h is controlled.

A d axis target current $I_d^*$ and a q axis target current $I_q^*$, which are target values of the drive currents of the motor 1, are calculated by a target value calculation element 20A on the basis of the detected value of the steering torque τ. The target value calculation element 20A is constituted by the first integrated circuit, and has a basic assist current calculation part 20e, a compensatory calculation part 20i, an addition part 20j, a dq axis target current calculation part 20k, and a derating calculation part 20o.

Figure 3:
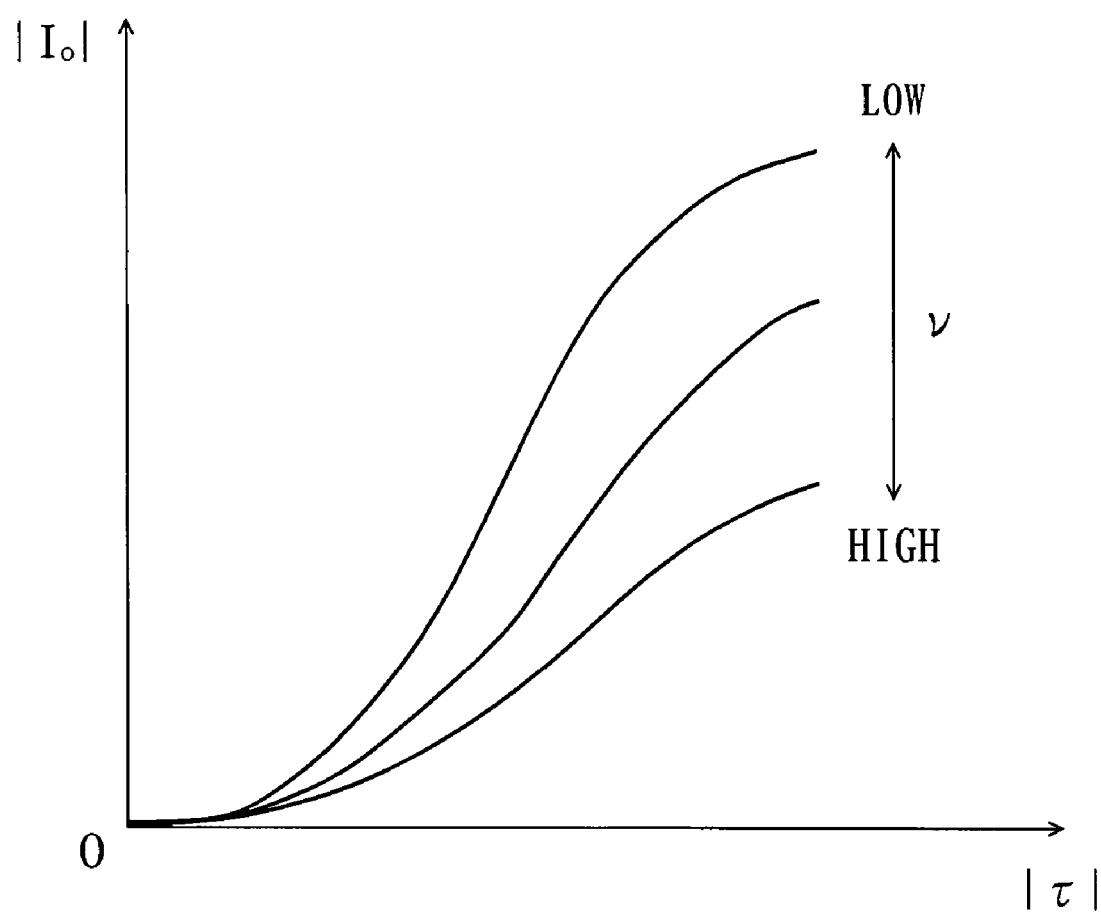
FIG. 3 is a view showing the relationship between steering torque, vehicle speed, and basic assist current in the electric power steering apparatus according to the embodiment of the present invention.

More specifically, the detected value of the steering torque τ is input into the basic assist current calculation part 20e via an A/D conversion part 20d. A first input data communication processing part 20f capable of communication with the CAN driver 10c is provided in the first integrated circuit so that the d axis target current $I_d^*$ and q axis target current $I_q^*$ can be calculated by the target value calculation element 20A in accordance with the detected value of the steering torque τ and the vehicle speed v, which serves as the vehicle condition data. Hence, the detected value of the vehicle speed v is input into the basic assist current calculation part 20e via the communication processing part 20f. In the basic assist current calculation part 20e, basic assist current $I_o$ corresponding to the detected steering torque τ and vehicle speed v is calculated on the basis of the relationship between the steering torque τ, vehicle speed v, and basic assist current $I_o$, which is stored in the form of a table or calculation formula. As shown in FIG. 3, for example, the relationship between the steering torque τ, vehicle speed v, and basic assist current $I_o$ is set such that the magnitude of the basic assist current $I_o$ increases as the steering torque τ increases and the vehicle speed v decreases.

The resolver 2, to which the excitation signal is transmitted from the resolver driving part 10j, outputs the detected value of the rotary position θ of the rotor 1b. The detected value of the rotary position θ is amplified by the resolver amp 10k and input into an R/D conversion part 20h via an A/D conversion part 20g, and thus converted into a digital signal corresponding to the rotary position θ of the rotor 1b. The rotary position θ of the rotor 1b, which is output by the R/D conversion part 20h, is input into the compensatory calculation part 20i together with the detected vehicle speed v as the detected values of variables affecting the steering torque. The compensatory calculation part 20i performs compensatory calculation to determine correction current $I_l$ to be added to the basic assist current $I_o$ in accordance with the rotary position θ and vehicle speed v. This compensatory calculation can be performed using a known method, in which the target values of the drive currents of the motor 1 are corrected on the basis of the detected values of the variables affecting the steering torque. For example, the correction current $I_l$ is determined such that the steering assist power attenuates in accordance with the rate of change dθ/dt in the rotary position θ and the vehicle speed v, and thus the steering characteristic is modified appropriately.

A target current I*, which is determined by adding the basic assist current $I_o$ to the correction current $I_l$ using the addition part 20j, is input into the dq axis target current calculation part 20k. The dq axis target current calculation part 20k calculates the d axis target current $I_d^*$ for generating magnetic field in the d axis direction and the q axis target current $I_q^*$ for generating magnetic field in the q axis direction, in which the d axis extends in a direction along the magnetic flux of the field magnet (magnet 1c) provided in the rotor 1b and the q axis extends in a direction perpendicular to the d axis and rotation axis of the rotor 1b. The calculations performed in the dq axis target current calculation part 20k can be performed with using known calculation formulae.

The current values detected by the current sensor 10m are amplified by the current sensor amp 10m' and input into a current detection circuit 20n via an A/D conversion part 20m, so that the values are converted into digital signals corresponding to the actual currents $I_U$, $I_V$, $I_W$ flowing through the respective coils of U, V and W phases. The temperature value detected by the thermistor 10d is converted into digital signal by an A/D conversion part 20u. The detected current values and temperature value are input into the derating calculation part 20o as variables corresponding to the load of the motor 1. The derating calculation part 20o calculates an output decrease rate δ of the motor 1 based on a predetermined relationship on the basis of the detected current values and detected temperature value. The dq axis target current calculation part 20k calculates the d axis target current $I_d^*$ and q axis target current $I_q^*$, which are reduced in accordance with the output decrease rate δ transmitted from the derating calculation part 20o. Thus the target values of the drive currents of the motor 1 is reduced for the purpose of overload protection by the derating calculation part 20o on the basis of the detected values of the variables corresponding to the load of the motor 1. There are no particular limitations on the detected values of the variables corresponding to the load of the motor 1, for example, the continuous energizing duration can be used instead of the detected temperature value.

The first integrated circuit in the microcomputer chip 20 has an output monitoring element 20B for judging whether there is an abnormality by comparing the target value calculated by the target value calculation element 20A with the detected value of the drive currents of the motor 1. The output monitoring element 20B comprises a monitoring actual current coordinate conversion part 20p and an output monitoring part 20q.

The monitoring actual current coordinate conversion part 20p calculates a d axis actual current $I_d$ for generating magnetic field in the d axis direction and a q axis actual current $I_q$ for generating magnetic field in the q axis direction, on the basis of the actual currents $I_U$, $I_V$, $I_W$ of the respective coils of U, V and W phases detected by the current detection circuit 20n and the rotary position 0 of the rotor 1b detected by the R/D conversion part 20h. The calculations in the monitoring actual current coordinate conversion part 20p can be performed with using known calculation formulae.

The d axis target current $I_d^*$ and q axis target current $I_q^*$, which are calculated by the dq axis target current calculation part 20k, and the d axis actual current $I_d$ and q axis actual current $I_q$, which are calculated by the monitoring actual current coordinate conversion part 20p, are input into the output monitoring part 20q. The output monitoring part 20q judges whether there is an abnormality by comparing the target currents $I_d^*$ or $I_q^*$ with the actual currents $I_d$ or $I_q$. For example, when the deviation between the d axis target current $I_d^*$ and d axis actual current $I_d$ is equal to or greater than a set value, or when the deviation between the q axis target current $I_q^*$ and q axis actual current $I_q$ is equal to or greater than a set value, an abnormality signal is transmitted to the relay drive control part 20c. Upon reception of the abnormality signal, the relay drive control part 20c transmits a relay control signal to the relay driver 10f via the amplifier 10e, whereby the power source relay 10g is driven and power supply from the battery to the motor driver 10h is interrupted.

A second integrated circuit illustrated in FIG. 2 as a function block is provided in the DSP chip 30, which is another chip from the microcomputer chip 20. The first integrated circuit provided in the microcomputer chip 20 is connected communicably to the second integrated circuit via SCIs (Serial Communication Interfaces) 20", 30" provided in respective chips 20, 30. The second integrated circuit exhibits the following functions.

The second integrated circuit has a drive signal value calculation element 30A. The drive signal value calculation element 30A calculates target applied voltages $v_U^*$, $v_V^*$, $v_W^*$, which are the drive signal values for the motor 1, on the basis of the d axis target current $I_d^*$ and q axis target current $I_q^*$, which are the target values calculated by the target value calculation element 20A, the detected actual currents $I_U$, $I_V$, $I_W$, which are the detected values of the drive currents of the motor 1, and the detected value of the rotary position θ of the rotor 1b. The drive signal value calculation element 30A is constituted by the second integrated circuit, and has a target current instruction part 30a, an actual current coordinate conversion part 30f, deviation calculation parts 30g, 30i, PI calculation parts 30h, 30j, and a target voltage coordinate conversion part 30k.

The d axis target current $I_d^*$ and q axis target current $I_q^*$ which are calculated by the dq axis target current calculation part 20k in the microcomputer chip 20, are transmitted to the target current instruction part 30a via the SCIs 20'', 30''. Further, the detected current values amplified by the current sensor amp 10m' are input into a current detection circuit 30c via an A/D conversion part 30b, and converted into digital signals corresponding to the detected actual currents $I_U, I_V, I_W$ of the respective coils of U, V and W phases. The detected value of the rotary position θ, which is amplified by the resolver amp 10k, is input into an R/D conversion part 30e via an A/D conversion part 30d, and converted into a digital signal corresponding to the rotary position θ of the rotor 1b.

The actual current coordinate conversion part 30f calculates the d axis actual current $I_d$ for generating magnetic field in the d axis direction and the q axis actual current $I_q$ for generating magnetic field in the q axis direction, on the basis of the detected actual currents $I_U, I_V, I_W$ of the respective coils of U, V and W phases and the detected rotary position θ of the rotor 1b. The calculations in the actual current coordinate conversion part 30f can be performed with using known calculation formulae.

The target current instruction part 30a outputs the d axis target current $I_d^*$ and q axis target current $I_q^*$ transmitted from the microcomputer chip 20. The deviation calculation part 30g determines the deviation between the d axis target current $I_d^*$ from the target current instruction part 30a and the d axis actual current Id from the actual current coordinate conversion part 30f, whereupon the determined deviation is subjected to PI calculation in the PI calculation part 30h to determine a d axis target voltage $v_d^*$. The deviation calculation part 30i determines the deviation between the q axis target current $I_q^*$ from the target current instruction part 30a and the q axis actual current $I_q$ from the actual current coordinate conversion part 30f, whereupon the determined deviation is subjected to PI calculation in the PI calculation part 30j to determine a q axis target voltage $v_q^*$. The target voltage coordinate conversion part 30k calculates the target applied voltages $v_U^*, v_V^*, v_W^*$ to be applied to the respective coils of U, V and W phases of the motor 1 on the basis of the target voltages $v_d^*$ and $v_q^*$ obtained from the PI calculation parts 30h, 30j and the rotary position θ obtained from the R/D conversion part 30e. The calculations in the target voltage coordinate conversion part 30k can be performed with using known calculation formulae.

A PWM signal formation part 30m constituted by the second integrated circuit forms PWM signals having duty ratios corresponding to the target applied voltages $v_U^*, v_V, v_W^*$ calculated by the target voltage coordinate conversion part 30k, and transmits the generated PWM signals to the pre-driver 10i. The motor driver 10h has a FET bridge circuit for interrupting and allowing the electric current from the power source relay 10g to the motor 1, and the FETs constituting the bridge circuit are operated by the pre-driver 10i in accordance with the PWM signals to control the supply of power to the motor 1. Thus, a driving element 10A for driving the motor 1 in accordance with the drive signal values is constituted by the pre-driver 10i and motor driver 10h.

The operating frequency of the second integrated circuit provided in the DSP chip 30 is set to be higher than the operating frequency of the first integrated circuit provided in the microcomputer chip 20, so that the calculation cycle of the target applied voltages $v_U^*, v_V^*, v_W^*$, which are the drive signal values for the motor 1, is set to be shorter than the calculation cycle of the d axis target current $I_d^*$ and q axis target current $I_q^*$, which are the target values.

The second integrated circuit provided in the DSP chip 30 has an input monitoring element 30B for judging whether there is an abnormality by comparing the target value calculated by the target value calculation element 20A with the detected value of the steering torque τ. The input monitoring element 30B has an input monitoring part 30o.

The detected value of the steering torque τ is input into the input monitoring part 30o via an A/D conversion part 30n, and the q axis target current $I_q^*$ is also input into the input monitoring part 30o from the target current instruction part 30a. The input monitoring part 30o judges whether there is an abnormality by comparing the detected value of the steering torque τ with the q axis target current $I_q^*$. For example, the input monitoring part 30o determines a torque value corresponding to the q axis target current $I_q^*$, and when the deviation between the determined torque value and the detected value of the steering torque τ is equal to or greater than a set value, an abnormality signal is transmitted to a relay drive control part 30p. Upon reception of the abnormality signal, the relay drive control part 30p transmits a relay control signal to the relay driver 10f via the amplifier 10e such that the power source relay 10g is driven and the power supply from the battery to the motor driver 10h is interrupted.

The first integrated circuit in the microcomputer chip 20 and the second integrated circuit in the DSP chip 30 have WD (Watch Dog) signal output parts 20s, 30r and WD signal monitoring parts 20t, 30s for outputting WD signals to each other at fixed intervals to confirm mutual operations. The WD signal monitoring part 20t transmits an abnormality signal to the relay drive control part 20c when the reception of the WD signals ceases, and the WD signal monitoring part 30s transmits an abnormality signal to the relay drive control part 30p when the reception of the WD signals ceases. In other words, the WD signal monitoring part 20t constitutes a first monitoring part for judging whether there is an abnormality in the operation of the second integrated circuit, and the WD signal monitoring part 30s constitutes a second monitoring part for judging whether there is an abnormality in the operation of the first integrated circuit.

The first integrated circuit in the microcomputer chip 20 has an input/output failsafe part 20r, which serves as a detection condition monitoring element for judging whether there is an abnormality in the detected values required by the target value calculation element 20A to calculate the target values and by the drive signal value calculation element 30A to calculate the drive signal values. In this embodiment, when one of the steering torque τ, vehicle speed v, rotary position θ of the rotor 1b, and actual detected currents $I_U, I_V, I_W$ ceases to be input into the first integrated circuit, the input/output failsafe part 20r transmits an abnormality signal to the relay drive control part 20c.

Figure 4:
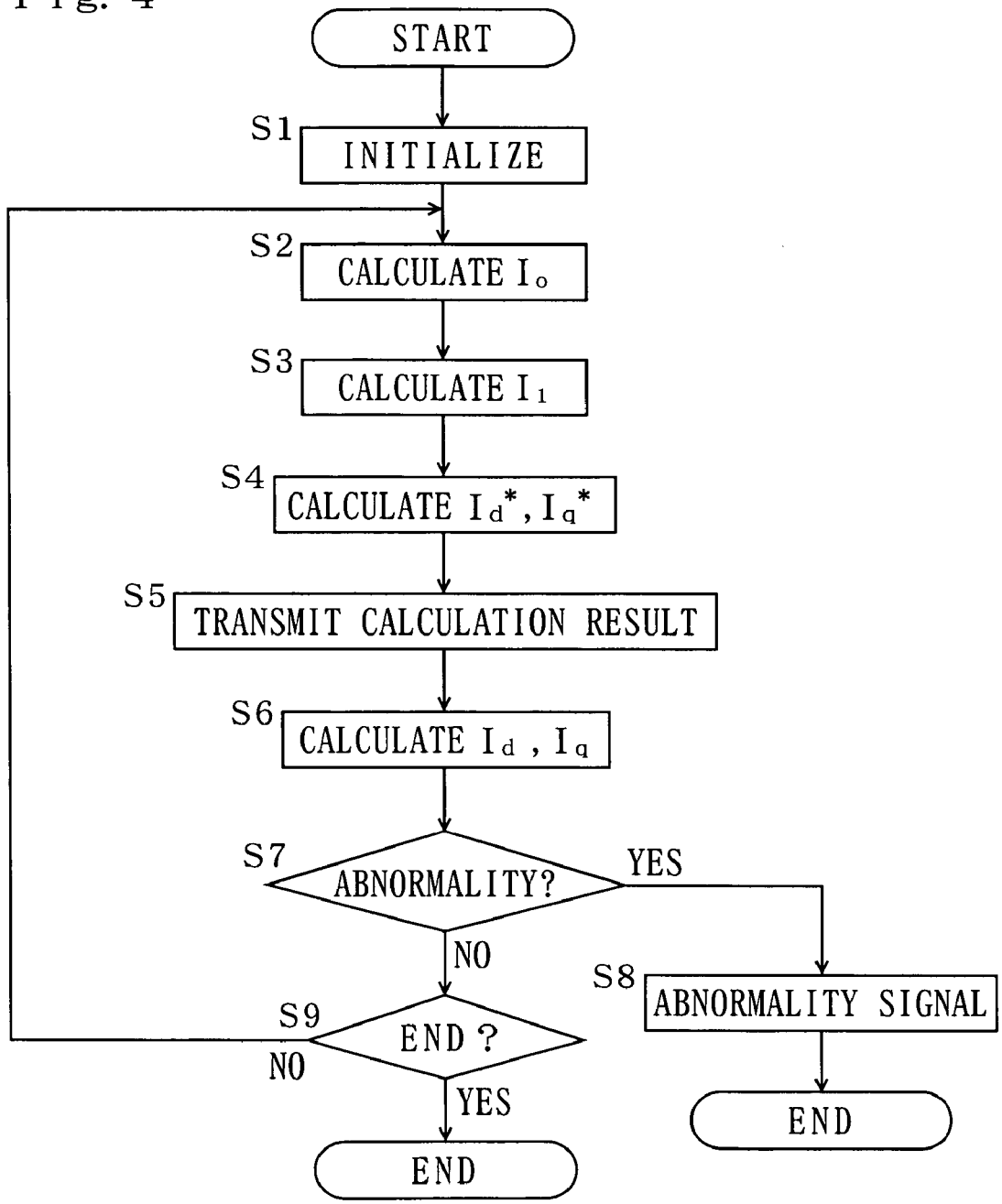
FIG. 4 is a flowchart illustrating a calculation procedure performed by a microcomputer chip constituting the controller according to the embodiment of the present invention.

The flowchart in FIG. 4 shows the calculation procedure performed by the first integrated circuit in the microcomputer chip 20. First, initialization is performed through communication with the EEPROM 10n (step S1). Next, the basic assist current $I_o$ is determined from the detected values of the steering torque τ and vehicle speed v (step S2), and the correction current $I_l$ is determined from the vehicle speed v and the rotary position θ of the rotor 1b (step S3). The d axis target current $I_d^*$ and q axis target current $I_q^*$ corresponding to the target current I*, which is the sum of the determined basic assist current $I_o$ and the correction current $I_l$, are then calculated (step S4), whereupon the calculation result is transmitted to the DSP chip 30 (step S5). The d axis actual current Id and q axis actual current $I_q$ are then calculated on the basis of the actual currents $I_U$, $I_V$, $I_W$ flowing through the coils of the motor 1 and the rotary position θ of the rotor 1*b* (step S6), and a judgment as to whether or not abnormality signal output is required is made in each of the output monitoring part 20*q*, the WD monitoring part 20*t*, and the input/output failsafe part 20*r* (step S7). If the abnormality signal output is required, an abnormality signal is output to the relay drive control part 20*c* (step S8) to interrupt power supply to the motor 1. If it is judged in the step S7 that the abnormality signal output is not required, a judgment as to whether or not to terminate the calculations is made according to the ON/OFF state of the ignition switch (step S9). When the calculations are not to be terminated, the routine returns to the step S2.

Figure 5:
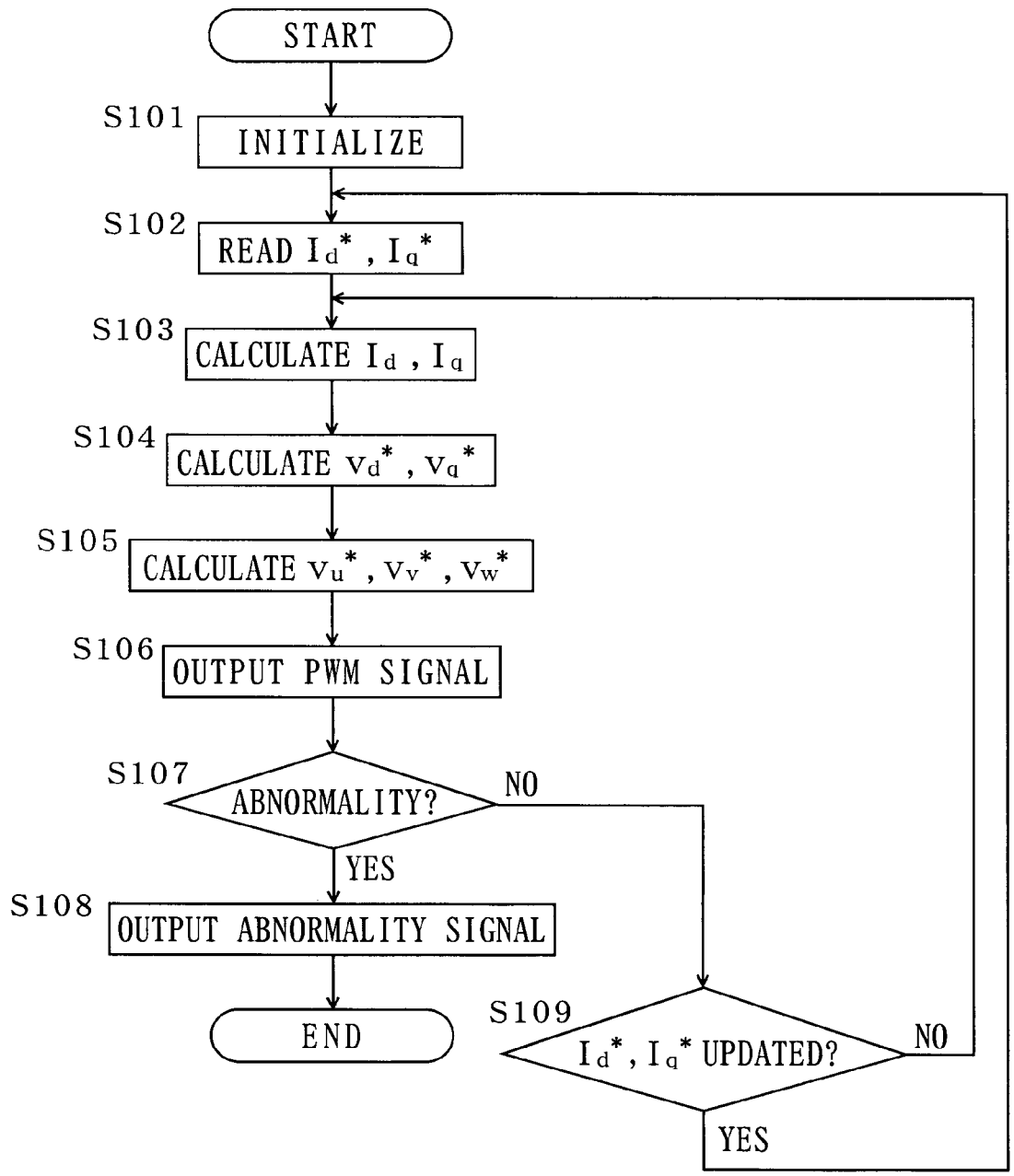
FIG. 5 is a flowchart illustrating a calculation procedure performed by a DSP chip constituting the controller according to the embodiment of the present invention.

The flowchart in FIG. 5 illustrates the calculation procedure performed by the second integrated circuit in the DSP chip 30. First, initialization is performed through communication with the EEPROM 10*n* (step S101). Next, the d axis target current $I_d^*$ and q axis target current $I_q^*$ transmitted from the microcomputer chip 20 are read (step S102). Since the calculation cycle of the target applied voltages $v_U^*$, $v_V^*$, $v_W^*$ is shorter than the calculation cycle of the d axis target current $I_d^*$ and q axis target current $I_q^*$, the read d axis target current $I_d^*$ and q axis target current $I_q^*$ are stored in a storage part constituted by the second integrated circuit and updated every time they are transmitted from the microcomputer chip 20. Next, the d axis actual current $I_d$ and q axis actual current $I_q$ are calculated on the basis of the detected actual currents $I_U$, $I_V$, $I_W$ of the coils and the detected rotary position θ (step S103), whereupon the d axis target voltage $v_d^*$, which corresponds to the deviation between the d axis target current $I_d^*$ transmitted from the microcomputer chip 20 and the d axis actual current $I_d$, and the q axis target voltage $v_q^*$, which corresponds to the deviation between the q axis target current $I_q^*$ transmitted from the microcomputer chip 20 and the q axis actual current $I_q$, are calculated (step S104). The target applied voltages $v_U^*$, $v_V^*$, $v_W^*$ to be applied to respective coils of U, V and W phases of the motor 1 are then calculated on the basis of the d axis target voltage $v_d^*$, the q axis target voltage $v_q^*$, and the detected rotary position θ (step S105), whereupon PWM signals corresponding to the target applied voltages $v_U^*$, $v_V^*$, $v_W^*$ are output (step S106). Next, a judgment as to whether or not abnormality signal output is required is made in each of the input monitoring part 30*o* and WD monitoring part 30*s* (step S107). If the abnormality signal output is required, an abnormality signal is output to the relay drive control part 30*p* (step S108) to interrupt power supply to the motor 1, whereupon the calculations end. If it is judged in the step S107 that the abnormality signal output is not required, a judgment as to whether or not the d axis target current $I_d^*$ and q axis target current $I_q^*$ have been updated is made (step S109), and if not, the routine returns to the step S103, and if so, the routine returns to the step S102, where the updated d axis target current $I_d^*$ and q axis target current $I_q^*$ are read. When the calculations in the microcomputer chip 20 have ended, the calculations in the DSP chip 30 are also terminated.

The calculation cycle of the d axis target current $I_d^*$ and q axis target current $I_q^*$ in the first integrated circuit is performed in a set value, for example, it is set at 1 msec. Meanwhile, the calculation cycle of the target applied voltages $v_U^*$, $v_V^*$, $v_W^*$ in the second integrated circuit is shorter than the calculation cycle of the d axis target current $I_d^*$ and q axis target current $I_q^*$ in the first integrated circuit, for example, it is set at 200 µsec. In other words, the calculations of the d axis target current $I_d^*$ and q axis target current $I_q^*$, which are non-typological and more complicated than the calculations of the target applied voltages $v_U^*$, $v_V^*$, $v_W^*$, are performed in the first integrated circuit, in which calculations are performed at comparatively low speed, while the calculations of the target applied voltages $v_U^*$, $v_V^*$, $v_W^*$, which are typological and comparatively simple, are performed in the second integrated circuit, in which the calculations are performed at comparatively high speed. As a result, the controller 10 does not require a high-performance integrated circuit chip for performing non-typological, complicated calculations at high speed, and instead can be constituted by the microcomputer chip 20 provided with the first integrated circuit, which is sufficient for performing non-typological, comparatively complicated calculations at comparatively low speed, and the DSP chip 30 provided with the second integrated circuit, which is sufficient for performing typological, comparatively simple calculations at comparatively high speed. Thus the controller 10 can be constituted by the low-cost integrated circuit chips 20, 30. Furthermore, since the target value calculation element 20A in the first integrated circuit has the compensatory calculation part 20*i*, calculations for correcting the target values in order to improve the steering feeling etc. can be performed by the first integrated circuit, which has surplus calculation processing capacity due to its comparatively low calculation speed. Moreover, since the first integrated circuit has the input/output failsafe part 20*r*, a detection condition monitoring element for judging whether there is an abnormality in the detected values, which are required by the first integrated circuit to calculate the target values and by the second integrated circuit to calculate the drive signal values, can be constituted by the first integrated circuit, which has surplus calculation processing capacity due to its comparatively low calculation speed.

By providing the microcomputer chip 20 with the output monitoring element 20B and providing the DSP chip 30 with the input monitoring element 30B, the need for dedicated hardware to monitor the presence of abnormalities in the values calculated by the first integrated circuit and second integrated circuit is eliminated. Moreover, by providing the target value calculation element 20A in the first integrated circuit with the derating calculation part 20*o*, the need for dedicated hardware for the purpose of overload protection is eliminated.

Figure 6:
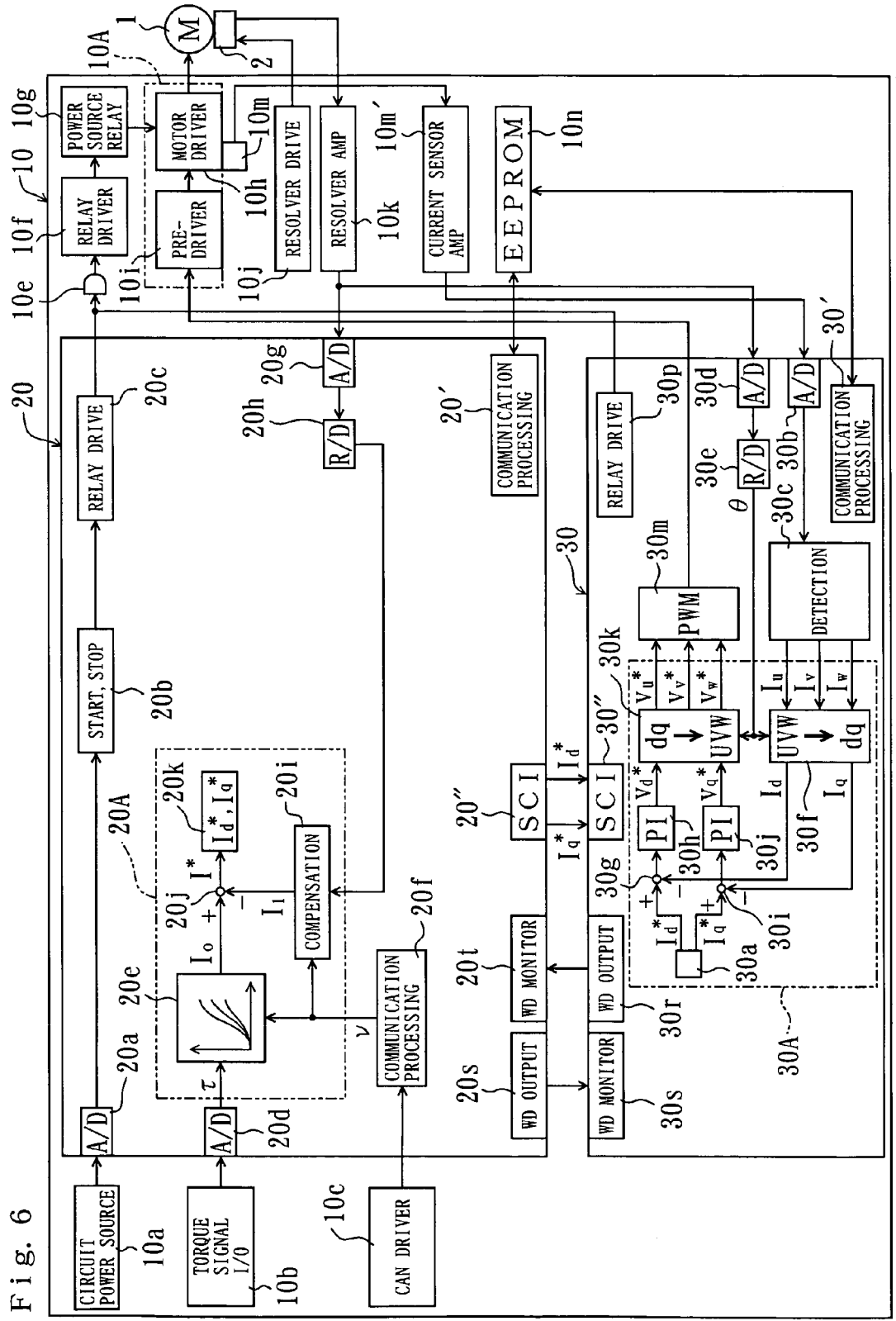
FIG. 6 is a view illustrating the constitution of a controller according to a first modified example of the present invention.

FIG. 6 shows a first modified example of the present invention. In contrast to the embodiment described above, the thermistor 10*d* for detecting the atmospheric temperature in the controller 10, the A/D conversion part 20*u*, derating calculation part 20*o*, A/D conversion part 20*m*, current detection circuit 20*n*, monitoring actual current coordinate conversion part 20*p*, and output monitoring part 20*q* in the microcomputer chip 20, and the A/D conversion part 30*n* and input monitoring part 30*o* in the DSP chip 30 are not provided, and hence the integrated circuits in the microcomputer chip 20 and DSP chip 30 do not comprise the overload prevention function and input/output abnormality monitoring function. In this case, a chip having a dedicated integrated circuit exhibiting the overload prevention function and input/output abnormality monitoring function can be provided separately to the microcomputer chip 20 and DSP chip 30, and it can be connected to the integrated circuits in the microcomputer chip 20 and DSP chip 30. In all other respects, this modified example is similar to the above embodiment, and identical parts are illustrated using the identical reference symbols.

Figure 7:
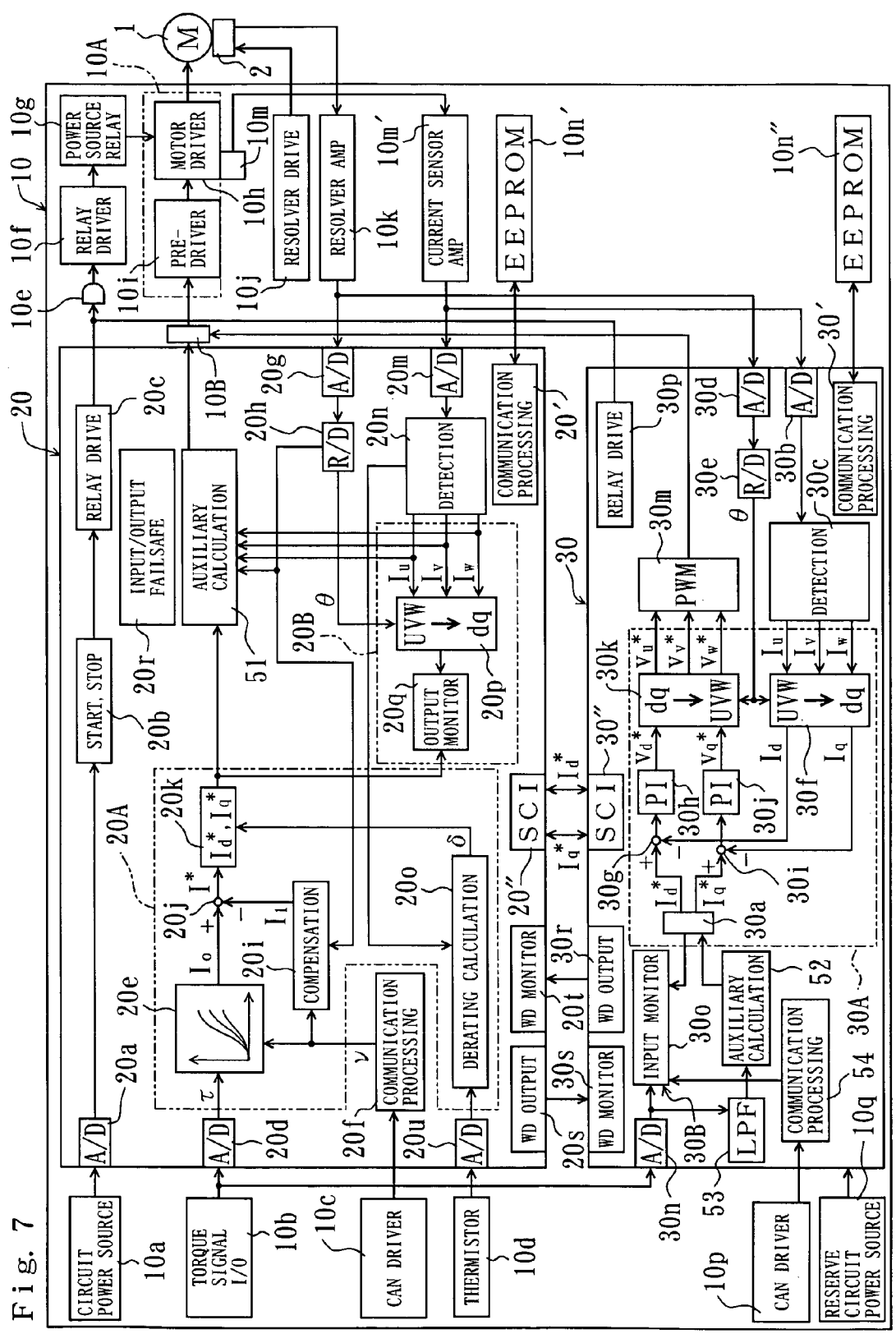
FIG. 7 is a view illustrating the constitution of a controller according to a second modified example of the present invention.
Figure 8:
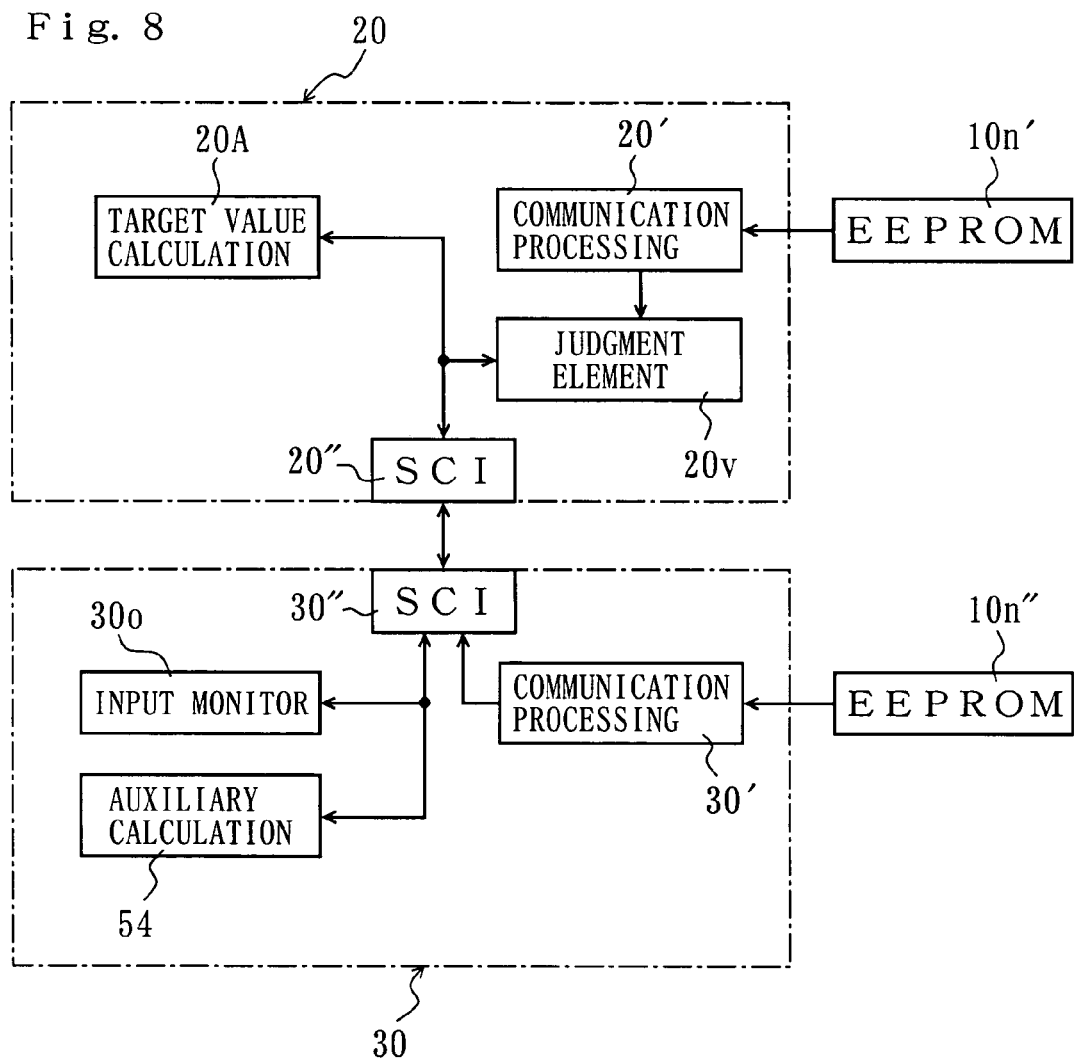
FIG. 8 is a view illustrating a constitution for performing processing when a data abnormality occurs in an EEPROM according to the second modified example of the present invention.

FIGS. 7 to 9 show a second modified example of the present invention.

In the second modified example, a first auxiliary calculation element 51 is constituted by the first integrated circuit. The first auxiliary calculation element 51 calculates target applied voltages which are auxiliary drive signal values for the motor 1, and forms PWM signals having duty ratios corresponding to the target applied voltages. The auxiliary drive signal values in this modified example are calculated on the basis of the d axis target current $I_d^*$ and q axis target current $I_q^*$, which are calculated by the target value calculation element 20A, the detected actual currents $I_U$, $I_V$, $I_W$, and the detected value of the rotary position θ of the rotor 1*b*.

A signal selection element 10B for connecting the driving element 10A to the drive signal value calculation element 30A and the first auxiliary calculation element 51 selectively is constituted by the controller 10. The signal selection element 10B is constituted, for example, by an OR circuit having two input terminals and one output terminal wherein the PWM signal formation part 30*m* is connected to one of the input terminals, the first auxiliary calculation element 51 is connected to the other input terminal, and the pre-driver 10*i* is connected to the output terminal.

In this modified example, the WD signal monitoring part 20*t*, which constitutes the first monitoring part for judging whether there is an abnormality in the operation of the second integrated circuit, output an abnormality signal to the first auxiliary calculation element 51 rather than the relay drive control part 20*c* when the reception of the WD signals ceases. Upon input of the abnormality signal, the first auxiliary calculation element 51 outputs PWM signals corresponding to the auxiliary drive signal values to the signal selection element 10B. Thus, the driving element 10A is connected to the first auxiliary calculation element 51 such that the motor 1 is driven by PWM signals corresponding to the auxiliary drive signal values instead of the drive signal values, when the PWM signal formation part 30*m* ceases to output the PWM signals corresponding to the drive signal values to the signal selection element 10B due to an abnormality in the operation of the second integrated circuit.

The constitution of the signal selection element 10B is not limited to that described above, for example, the signal selection element 10B can be constituted by a switch, which connects the PWM signal formation part 30*m* and first auxiliary calculation element 51 to the pre-driver 10*i* selectively, wherein the PWM signal formation part 30*m* is connected to the pre-driver 10*i* normally, and the first auxiliary calculation element 51 is connected to the pre-driver 10*i* when an abnormality signal is input.

Further, there are no particular limitations on the auxiliary drive signal values calculated by the first auxiliary calculation element 51, for example, the values can be calculated such that the output of the motor 1 decreases gradually to zero within a set time period when an abnormality signal is input. In this case, the steering torque τ, vehicle speed ν, rotary position θ of the rotor 1*b*, and detected actual currents $I_U$, $I_V$, $I_W$ are not required for calculating the auxiliary drive signal values. Hence, when one of the steering torque τ, vehicle speed ν, rotary position θ of the rotor 1*b*, and detected actual currents $I_U$, $I_V$, $I_W$ ceases to be input into the first integrated circuit, the input/output failsafe part 20*r* can output an abnormality signal to the first auxiliary calculation element 51 and signal selection element 10B rather than the relay drive control part 20*c*. In this case, when an abnormality signal is input from the WD signal monitoring part 20*t* or input/output failsafe part 20*r*, the first auxiliary calculation element 51 outputs PWM signals corresponding to the auxiliary drive signal values to the signal selection element 10B, whereupon the signal selection element 10B connects the first auxiliary calculation element 51 to the pre-driver 10*i*.

In the second modified example, a second auxiliary calculation element 52 is constituted by the second integrated circuit. The second auxiliary calculation element 52 calculates the d axis target current $I_d^*$ and q axis target current $I_q^*$, which are the target values of the drive currents of the motor 1, on the basis of the detected value of the steering torque τ. More specifically, the detected value of the steering torque τ is input into the second auxiliary calculation element 52 via the A/D conversion part 30*n* and a low-pass filter 53. The low-pass filter 53 removes unnecessary high-frequency components from the detection signal of the steering torque τ and passes only signal components having a smaller frequency than the resonance frequency of the steering system. The relationship between the steering torque τ and the basic assist current is stored in the second auxiliary calculation element 52 in the form of a table or calculation formula, and is set such that, for example, the magnitude of the basic assist current increases as the steering torque τ increases. The basic assist current corresponding to the detected steering torque τ is determined in accordance with this relationship, whereupon the d axis target current $I_d^*$ and q axis target current $I_q^*$ correspond to the determined basic assist current are calculated.

In this modified example, the WD signal monitoring part 30*s*, which constitutes the second monitoring part for judging whether there is an abnormality in the operation of the first integrated circuit, outputs an abnormality signal to the second auxiliary calculation element 52 rather than the relay drive control part 30*p* when the reception of the WD signal ceases. Upon input of the abnormality signal, in other words when the d axis target current $I_d^*$ and q axis target current $I_q^*$ cease to be transmitted to the target current instruction part 30*a* from the target value calculation element 20A, the second auxiliary calculation element 52 outputs the d axis target current $I_d^*$ and q axis target current $I_q^*$ to the target current instruction part 30*a*. Thus, when an abnormality in the operation occurs in the first integrated circuit, the drive signal values for the motor 1 are calculated by the drive signal value calculation element 30A on the basis of the target values calculated by the second auxiliary calculation element 52.

The second auxiliary calculation element 52 need only calculate the target values of the drive currents of the motor 1 based on at least the detected value of the steering torque. For example, the second auxiliary calculation element 52 can calculate values corresponding not only to the detected value of vehicle speed ν but also to the detected value of the steering torque τ as the target values of the drive currents of the motor 1.

Furthermore, the controller 10 has a second CAN driver 10*p* (second vehicle condition data input portion) into which the signal from the vehicle speed sensor 12 corresponding to the detected value of vehicle speed ν, which is one of the vehicle condition data, is input via the CAN (Control Area Network). A second input data communication processing part 54 which is capable of communication with the second CAN driver 10*p* is provided in the second integrated circuit. The detected value of the vehicle speed ν is input into the input monitoring part 30*o* in the input monitoring element 30B via the communication processing part 54. As a result, the q axis target current $I_q^*$, which is a target value calculated by the target value calculation element 20A, the detected value of the steering torque τ, and the detected value of the vehicle speed ν are input into the input monitoring part 30*o*. Thus the input monitoring part 30*o* is capable of judging whether there is an abnormality by comparing the q axis target current $I_q^*$ with the detected value of the steering torque τ and the detected value of the vehicle speed ν. For example, the input monitoring part 30*o* determines a q axis current corresponding to the detected value of the steering torque τ and the detected value of the vehicle speed ν, and outputs an abnormality signal when the deviation between the q axis current and the q axis target current $I_q^*$ is equal to or greater than a set value. This abnormality signal can be transmitted to the drive signal value calculation element 30A and the second auxiliary calculation element 52 instead of the relay drive control part 30p. In so doing, the drive signal values for the motor 1 can be calculated from the d axis target current $I_d^*$ and q axis target current $I_q^*$ which are calculated by the second auxiliary calculation element 52 and output to the target current instruction part 30a, instead of the d axis target current $I_d^*$ and q axis target current $I_q^*$ which are calculated by the target value calculation element 20A.

The vehicle condition data which are input into the first and second integrated circuits from the CAN via the respective CAN drivers 10c, 10p are not limited to the vehicle speed v, for example, braking force and others can be input as vehicle condition data, and the motor 1 can be controlled comprehensively in accordance with information relating to the entire vehicle rather than simply steering system information. When the motor 1 is controlled comprehensively in accordance with the information relating to the entire vehicle rather than simply steering system information, errors of abnormality judgment during failsafe processing can be eliminated. Furthermore, when an abnormality occurs in one of the two integrated circuits or one of the two CAN drivers 10c, 10p, the occurrence of the abnormality can be transmitted to an external system and a controller fault notification can be performed.

The controller 10 of this modified example comprises a second circuit power source 10q including a regulator for regulating the voltage of the battery to a constant level, and hence power supply to the first integrated circuit in the microcomputer chip 20 is covered by the circuit power source 10a, while power supply to the second integrated circuit in the DSP chip 30 is covered by the second circuit power source 10q. As a result, when a fault occurs in one of the two circuit power sources 10a, 10q, the motor 1 can be controlled by one of the first integrated circuit and second integrated circuit.

In this modified example, the controller 10 has a first EEPROM 10n' as a first non-volatile memory and a second EEPROM 10n" as a second non-volatile memory. The first EEPROM 10n' stores an initializing program, control data for the motor 1, and sum check data for the control data. The second EEPROM 10n" stores an initializing program, identical control data to those stored in the first EEPROM 10n', and identical sum check data to those stored in the first EEPROM 10n'. A first stored data communication processing part 20' capable of data communication with the first EEPROM 10n' is constituted by the first integrated circuit so that the control data stored in the first EEPROM 10n' can be used in the calculations performed in the first integrated circuit. Besides, a second stored data communication processing part 30' capable of data communication with the second EEPROM 10n" is constituted by the second integrated circuit so that the control data stored in the second EEPROM 10n" can be used in the calculations performed in the second integrated circuit. For example, a predetermined correction value for offset-correcting the detected value of the steering torque τ is stored as the control data for the motor 1. Variation of the detected value of the steering torque τ from the actual value, occurring due to individual differences in the torque sensor 11, is measured in advance, and this measured value is set as the correction value. When the controller 10 is activated such that initialization is performed by the program stored in the first EEPROM 10n', initial values required for the calculations performed in the first integrated circuit are set, and the correction value stored in the first EEPROM 10n' is used as a value for offset-correcting the detected value of the steering torque τ, which is employed in the calculations performed in the target value calculation element 20A. Besides, when the controller 10 is activated such that initialization is performed by the program stored in the second EEPROM 10n", initial values required for the calculations performed in the second integrated circuit are set, and the correction value stored in the second EEPROM 10n" is used as a value for offset-correcting the detected value of the steering torque τ, which is employed in the calculations performed in the input monitoring part 30o and second auxiliary calculation element 52. There are no particular limitations on the number and type of control data stored in each EEPROM 10n', 10n", and for example, failsafe information such as a set value serving as a reference for outputting an abnormality signal from the input monitoring part 30o can also be stored as the control data.

FIG. 8 shows the function block of a circuit for performing processing when a data abnormality occurs in the EEPROMs 10n', 10n". In this modified example, the control data stored in the first EEPROM 10n' are input into a judgment element 20v constituted by the first integrated circuit via the communication processing part 20', and the control data stored in the second EEPROM 10n" are input into the judgment element 20v via the communication processing part 30' and SCIs 20", 30". The judgment element 20v judges whether there are abnormal data in one of the two EEPROMs 10n', 10n" from the result of sum check of the control data stored in the first EEPROM 10n' and the result of sum check of the control data stored in the second EEPROM 10n".

As shown in FIG. 9, for example, four pieces of control data A1, B2, C3 and D4 are stored in the first EEPROM 10n' together with sum check data corresponding to the sum of the two most significant bits and the sum of the two least significant bits of each of the control data A1, B2, C3 and D4, and four pieces of control data A2, B3, C4 and D5 are stored in the second EEPROM 10n" together with sum check data corresponding to the sum of the two most significant bits and the sum of the two least significant bits of each of the control data A2, B3, C4 and D5. It is assumed here that the control data A1, B2, C3 and D4 are respectively equal to the control data A2, B3, C4 and D5. The judgment element 20v determines the sum of the two most significant bits and the sum of the two least significant bits of each piece of the control data, and judges whether or not a data abnormality has occurred by judging whether or not the respective determined sums match the corresponding sum check data.

When there are no data abnormalities in the two EEPROMs 10n', 10", the control data stored in the first EEPROM 10n' are used in the calculations performed in the target value calculation element 20A in the first integrated circuit via the judgment element 20v, and the control data stored in the second EEPROM 10n" are used in the calculations performed in the input monitoring part 30o and second auxiliary calculation element 52 in the second integrated circuit via the judgment element 20v and the SCIs 20", 30". When a data abnormality occurs in the first EEPROM 10n', the control data stored in the second EEPROM 10n" are used in the calculations performed in the target value calculation element 20A via the communication processing part 30', the SCIs 20", 30", and the judgment element 20v. When a data abnormality occurs in the second EEPROM 10n", the control data stored in the first EEPROM 10n' are used in the calculations performed in the input monitoring part 30o and second auxiliary calculation element 52 via the communication processing part 20' and the judgment element 20v.

The judgment element 20v can be constituted by the second integrated circuit instead of the first integrated circuit.

Thus, when a data abnormality occurs in one of the first EEPROM 10n' and the second EEPROM 10n", calculations can be performed in accordance with the data stored in the other EEPROM. Hence, control can be continued even when a fault occurs in one of the EEPROMs 10n', 10n". Furthermore, whether there are abnormal data in the EEPROMs 10n', 10n" can be judged simply by storing sum check data in addition to the control data, and hence the data amount required to judge whether there are abnormal data can be reduced, enabling reduction in the overall storage capacity of the EEPROMs 10n', 10n". As shown in FIG. 10, for example, when four types of control data A, B, C and D are stored in a single EEPROM, three pieces of data of an identical type to each data type should be stored to judge whether there are abnormal data. In this case, the normal data can be specified by performing a majority determination through a comparison of the two most significant bits of each identical data type and a majority determination through a comparison of the two least significant bits of each identical data type. In FIG. 10, data in which the two most significant bits and the two least significant bits are both "00" are normal. The total data amount in the example shown in FIG. 10 is three times as large as that of a case in which one piece of data of an identical type is stored for each data type. In this modified example, on the other hand, the total data amount equals the sum of the data amount of the sum check data and double the amount when one piece of data of an identical type is stored for each data type. Hence, the total data capacity of the EEPROMs 10n' and 10n" can be reduced, enabling a reduction in cost.

Other constitutions in the second modified example are assumed to be similar to those of the embodiment described above.

According to the second modified example, when an abnormality occurs in the second integrated circuit, the motor 1 can be driven by the driving element 10A in accordance with the auxiliary drive signal values calculated by the first auxiliary calculation element 51 constituted by the first integrated circuit. Hence, even when an abnormality occurs in the second integrated circuit, the steering assist power can be reduced gently or can be applied through simple control without stopping the motor 1 rapidly, thereby preventing an excessive impact from acting on the driver. Further, when an abnormality occurs in the first integrated circuit, the drive signal values for the motor 1 can be calculated on the basis of the target values calculated by the second auxiliary calculation element 52 constituted by the second integrated circuit. Hence, even when an abnormality occurs in the first integrated circuit, the steering assist power can be reduced gently or can be applied through simple control without stopping the motor 1 rapidly, thereby preventing an excessive impact from acting on the driver. The second modified example is also capable of exhibiting similar functions and effects to those of the embodiment described above.

The present invention is not limited to the embodiment described above. For example, a logic IC chip or the like assembled from a microcomputer chip, a gateway, and so on can be used as the chip in which the second integrated circuit is provided. Further, there are no particular limitations on the type of calculation used to correct the target values in the compensatory calculation part as long as the steering feeling is modified to an appropriate level thereby. For example, the target values can be corrected in accordance with the rate of change or rate of acceleration in the steering torque or steering angle. Furthermore, the embodiment described above shows an example in which the motor currents are vector-controlled by converting current values and voltage values into dq axes values, but the motor currents can be controlled without converting these values into dq axes values.

What is claimed is:

1. A controller for an electric power steering apparatus, comprising:
    a target value calculation element for calculating target values of drive currents of a brushless motor for generating steering assist power on a basis of at least a detected value of steering torque;
    a drive signal value calculation element for calculating drive signal values for driving said motor on a basis of the target values calculated by said target value calculation element, detected values of the drive currents of said motor, and a detected value of a rotary position of a rotor of said motor; and
    a driving element for driving said motor in accordance with said drive signal values,
    wherein:
        said target value calculation element is constituted by a first integrated circuit provided in a chip,
        said drive signal value calculation element is constituted by a second integrated circuit provided in another chip,
        said first integrated circuit is connected communicably to said second integrated circuit, and
        a drive signal calculation cycle of said drive signal values repeatedly executed by said second integrated circuit is set to be shorter than a target value calculation cycle of said target values repeatedly executed by said first integrated circuit.

2. The controller for an electric power steering apparatus according to claim 1, wherein:
    said first integrated circuit has an output monitoring element for judging whether there is an abnormality by comparing said target value calculated by said target value calculation element with said detected value of the drive current, and
    said second integrated circuit has an input monitoring element for judging whether there is an abnormality by comparing said target value calculated by said target value calculation element with said detected value of the steering torque.

3. The controller for an electric power steering apparatus according to claim 2, wherein:
    a first input data communication processing part effects communication with a first vehicle condition data input part and is constituted by said first integrated circuit such that said target values are calculated by said target value calculation element in accordance with said detected value of the steering torque and vehicle condition data, and
    a second input data communication processing part effects communication with a second vehicle condition data input part and is constituted by said second integrated circuit such that said input monitoring element judges whether there is an abnormality by comparing said target values calculated by said target value calculation element to said detected value of the steering torque and said vehicle condition data.

4. The controller of claim 2 wherein:
    said first integrated circuit includes a first A/D converter for receiving a signal indicating the steering torque and outputting the detected value of the steering torque read during each calculation cycle of the first integrated circuit;
    said second integrated circuit includes a second A/D converter for receiving a signal indicating the steering torque and outputting a second detected value of the steering torque read during each calculation cycle of the second integrated circuit; and the output monitoring element of said second integrated circuit is a first integrated circuit monitoring unit which accepts the second detected value of the steering torque and the target values of drive current produce by the first integrated circuit based upon which it is determined if an abnormality exists in the first integrated circuit.

5. The controller of claim 4 wherein:
said first integrated circuit includes a third A/D converter for receiving a signal indicating the drive currents of said motor and producing second detected drive current values read during each calculation cycle of the first integrated circuit;
said second integrated circuit includes a fourth A/D converter for receiving a signal indicating the drive currents of said motor and producing the detected values of the drive currents read during each calculation cycle of the second integrated circuit; and
said first integrated circuit including a second integrated circuit monitoring unit which accepts the second detected drive current values of the drive currents of the motor and the target values of drive currents produce by the first integrated circuit based upon which it is determined if an abnormality exists in the second integrated circuit.

6. The controller for an electric power steering apparatus according to claim 1, wherein said target value calculation element has a derating calculation part for reducing said target values on a basis of a variable corresponding to load of said motor in order to prevent overload.

7. The controller for an electric power steering apparatus according to claim 1, wherein said target value calculation element has a compensatory calculation part for correcting said target values on a basis of detected values of variables affecting said steering torque.

8. The controller for an electric power steering apparatus according to claim 1, wherein said first integrated circuit has a detection condition monitoring element for judging whether there is an abnormality in the detected values required to calculate said target values and said drive signal values.

9. The controller for an electric power steering apparatus according to claim 1, further comprising:
a first monitoring part for judging whether there is an abnormality in the operation of said second integrated circuit; and
a first auxiliary calculation element for calculating auxiliary drive signal values for said motor,
wherein said first auxiliary calculation element is constituted by said first integrated circuit, and
a signal selection element which connects said driving element to said drive signal value calculation element and said first auxiliary calculation element selectively is provided such that said motor is driven in accordance with said auxiliary drive signal values instead of said drive signal values when the abnormality in the operation occurs in said second integrated circuit.

10. The controller for an electric power steering apparatus according to claim 1, further comprising:
a second monitoring part for judging whether there is an abnormality in the operation of said first integrated circuit; and
a second auxiliary calculation element for calculating said target values of the drive currents of said motor on the basis of at least said detected value of the steering torque,
wherein said second auxiliary calculation element is constituted by said second integrated circuit, and
when an abnormality in the operation occurs in said first integrated circuit, said drive signal values for said motor is calculated by said drive signal value calculation element on the basis of said target values calculated by said second auxiliary calculation element.

11. The controller for an electric power steering apparatus according to claim 1, further comprising:
a first non-volatile memory for storing control data for said motor and sum check data for said control data;
a second non-volatile memory for storing identical control data and sum check data to said control data and sum check data stored in said first non-volatile memory; and
a judgment element for judging whether there are abnormal data in one of said two non-volatile memories from the result of sum check of said control data stored in said first non-volatile memory and the result of sum check of said control data stored in said second non-volatile memory,
wherein:
a first stored data communication processing part effects data communication with said first non-volatile memory and is constituted by said first integrated circuit such that said control data stored in said first non-volatile memory are used in the calculations performed in said first integrated circuit,
a second stored data communication processing part effects data communication with said second non-volatile memory and is constituted by said second integrated circuit such that said control data stored in said second non-volatile memory are used in the calculations performed in said second integrated circuit,
when a data abnormality occurs in said first non-volatile memory, said control data stored in said second non-volatile memory are used in the calculations performed in said first integrated circuit via said second stored data communication processing part, and
when a data abnormality occurs in said second non-volatile memory, said control data stored in said first non-volatile memory are used in the calculations performed in said second integrated circuit via said first stored data communication processing part.

12. The controller of claim 1 wherein:
the first integrated circuit calculates a target current value during each of said target value calculation cycles which is converted into an updated set of said target values and transmitted to said second integrated circuit;
the second integrated circuit reads' and stores said target values during first ones of said drive signal calculation cycles for which it is determined an updated set of said target values is transmitted by the first integrated circuit and applies the target values during a present one of said first ones of said drive value calculation cycles to calculation of said drive signal values; and
the second integrated circuit does not read said target values during second ones of said drive signal calculation cycles for which it is determined an apdated set of said target values is not transmitted byte first integrated circuit and applies the target values stored during said first ones of said drive value calculation cycles, and previously applied to calculation of said drive signals during said first one of said drive signal calculation cycles, to calculation of said drive signal values during a present one of said second ones of said drive signal calculation cycles.

13. The controller of claim 12 wherein said first integrated circuit operates at a first operating frequency, said second integrated circuit operates at a second operating frequency, and said first operating frequency is lower than said second operating frequency.

14. A controller for an electric power steering apparatus, comprising:
- a first control part having a target value calculation element which calculates target values of drive currents of a motor for generating steering assist power on a basis of at least a detected value of steering torque;
- a second control part having a drive signal value calculation element which calculates drive signal values for driving said motor on a basis of said target values calculated by said target value calculation element, detected values of the drive currents of said motor, and a detected value of a rotary position of a rotor of said motor; and
- a driving part for driving said motor in accordance with said drive signal values, wherein:
- said second control part is provided in a different chip than a chip in which said first control part is provided,
- said first control part and said second control part are connected communicably, and
- a drive signal calculation cycle of said drive signal values is repeatedly execute by said second control part and is set to be shorter than a target value calculation cycle of said target values repeatedly executed by said first control part.

15. The controller df claim 14 wherein;
- the first control part calculates a target current value during each of said target value calculation cycles which is converted into an updated set of said target values and transmitted to said second control part;
- the second control part reads and stores said target values during first ones of said drive signal calculation cycles for which it is determined an updated set of said target values is transmitted by the first control part and applies the target values during a present one of said first ones of said drive value calculation cycles to calculation of said drive signal values; and
- the second control part does not read said target values during second ones of said drive signal calculation cycles for which it is determined an updated set of said target values is not transmitted by the first control part and applies the target values stored during said first ones of said drive value calculation cycles, and previously applied to calculation of said drive signals during said first one of said drive signal calculation cycles, to calculation of said drive signal values during a present one of said second ones of said drive signal calculation cycles.

16. The controller of claim 15 wherein said first control part operates at a first operating frequency, said second control part operates at a second operating frequency, and said first operating frequency is lower than said second operating frequency.

17. The controller of claim 14 wherein:
- said first control part includes a first A/D converter for receiving a signal indicating the steering torque and outputting the detected value of the steering torque read during each calculation cycle of the first control part;
- said second control part includes a second AID converter for receiving a signal indicating the steering torque and outputting a second detected value of the steering torque read during each calculation cycle of the second control part; and
- said second control part including a first control part monitoring unit which accepts the second detected value of the steering torque and the target values of drive current produce by the first control part based upon which it is determined if an abnormality exists in the first control part.

18. The controller of claim 17 wherein: said first control part includes a third A/D converter for receiving a signal indicating the drive currents of said motor and producing second detected drive current values read during each calculation, cycle of the first control part;
- said second control part includes a fourth AID converter for receiving a signal indicating the drive currents of said motor and producing the detected values of the drive cwrent read during each calculation cycle of the second control part; and
- said first control part including a second control part monitoring unit which accepts the second detected drive current values of the drive currents of the motor and the target values of drive current produce by the first control pan based upon which it is determined if an abnormality exists in the second control part.

* * * * *